United States Patent
Abhari et al.

(10) Patent No.: US 7,846,323 B2
(45) Date of Patent: Dec. 7, 2010

(54) PROCESS FOR CO-PRODUCING JET FUEL AND LPG FROM RENEWABLE SOURCES

(75) Inventors: Ramin Abhari, Bixby, OK (US); Lynn Tomlinson, Tulsa, OK (US); Peter Havlik, Tulsa, OK (US); Nathan Jannasch, Broken Arrow, OK (US)

(73) Assignee: Syntroleum Corporation, Tulsa, OK (US)

( * ) Notice: Subject to any disclaimer, the term of this patent is extended or adjusted under 35 U.S.C. 154(b) by 483 days.

(21) Appl. No.: 12/062,970

(22) Filed: Apr. 4, 2008

(65) Prior Publication Data

US 2008/0244962 A1   Oct. 9, 2008

Related U.S. Application Data

(60) Provisional application No. 60/910,573, filed on Apr. 6, 2007.

(51) Int. Cl.
*C10L 1/18* (2006.01)
(52) U.S. Cl. .............................. 208/57; 208/58; 208/60; 208/67; 208/69; 208/70; 585/733; 585/750; 44/605
(58) Field of Classification Search ............. 208/57–58, 208/60, 67, 69, 70; 585/240, 733–734, 750; 44/605
See application file for complete search history.

(56) References Cited

U.S. PATENT DOCUMENTS

| 2,163,563 | A |   | 6/1939 | Schrauth |
| 4,943,672 | A | * | 7/1990 | Hamner et al. ............. 585/737 |
| 4,992,605 | A |   | 2/1991 | Craig et al. |
| 5,705,722 | A |   | 1/1998 | Monnier et al. |
| 5,851,338 | A |   | 12/1998 | Pushaw |
| 6,855,410 | B2 |  | 2/2005 | Buckley |

(Continued)

FOREIGN PATENT DOCUMENTS

EP           1728844           12/2006

(Continued)

OTHER PUBLICATIONS

Sharma, S.D.; Sagara, K. "Latent Heat Storage Materials and Systems: A Review", International Journal of Green Energy, 2: 1-56, 2005.

(Continued)

*Primary Examiner*—Glenn A Caldarola
*Assistant Examiner*—Brian McCaig
(74) *Attorney, Agent, or Firm*—Hall, Estill, Hardwick, Gable, Golden & Nelson, P.C.

(57) ABSTRACT

The present invention generally relates to a method for producing an isoparaffinic product useful as jet fuel from a renewable feedstock. The method may also include co-producing a jet fuel and a liquefied petroleum gas (LPG) fraction from a renewable feedstock. The method includes hydrotreating the renewable feedstock to produce a hydrotreating unit heavy fraction that includes n-paraffins and hydroisomerizing the hydrotreating unit heavy fraction to produce a hydroizomerizing unit heavy fraction that includes isoparaffins. The method also includes recycling the hydroisomerizing unit heavy fraction through the hydroisomerization unit to produce an isoparaffinic product that may be fractionated into a jet fuel and an LPG fraction. The present invention also relates to a jet fuel produced from a renewable feedstock having improved cold flow properties.

9 Claims, 2 Drawing Sheets

U.S. PATENT DOCUMENTS

| | | |
|---|---|---|
| 7,232,935 B2 | 6/2007 | Jakkula et al. |
| 2004/0055209 A1 | 3/2004 | Jakkula et al. |
| 2004/0230085 A1 | 11/2004 | Jakkula et al. |
| 2006/0161032 A1 | 7/2006 | Murzin et al. |
| 2006/0186020 A1 | 8/2006 | Gomes |
| 2006/0199984 A1 | 9/2006 | Kuechler et al. |
| 2006/0207166 A1 | 9/2006 | Herskowitz et al. |
| 2006/0264684 A1 | 11/2006 | Petri et al. |
| 2007/0006523 A1 | 1/2007 | Myllyoja et al. |
| 2007/0010682 A1 | 1/2007 | Myllyoja et al. |
| 2007/0161832 A1* | 7/2007 | Myllyoja et al. ............ 585/240 |
| 2007/0170091 A1 | 7/2007 | Monnier et al. |

FOREIGN PATENT DOCUMENTS

| | | |
|---|---|---|
| SE | 9700149 | 8/1997 |
| WO | WO 00/11117 | 3/2000 |
| WO | WO 2004/104142 | 12/2004 |
| WO | WO 2005/026297 | 3/2005 |
| WO | WO 2007/068795 | 6/2007 |

OTHER PUBLICATIONS

Wong, A. Monnier, J.; Stumborg, M.; Hogan E. "Technical and Economic Aspects of Manufacturing Cetane-Enhanced Diesel Fuel from Canola Oil"; Bio-Oils Symposium. Saskatoon, Saskatchewan, Canada; Mar. 2-3, 1994.

* cited by examiner

PROCESS FOR CO-PRODUCING JET FUEL AND LPG FROM RENEWABLE SOURCES

CROSS-REFERENCE TO RELATED APPLICATIONS

The present application claims the benefit under 35 U.S.C. 119(e) of U.S. Application Ser. No. 60/910,573, filed Apr. 6, 2007, which is hereby expressly incorporated by reference herein in its entirety.

STATEMENT REGARDING FEDERALLY SPONSORED RESEARCH OR DEVELOPMENT

Not applicable.

FIELD OF THE INVENTION

The present invention generally relates to a method for producing from a renewable feedstock an isoparaffinic product useful in producing jet fuel and/or jet fuel blendstock (hereinafter referred to as "jet fuel") or an LPG product. The present invention also relates to the resultant jet fuel, whereby the jet fuel has improved cold flow properties.

BACKGROUND OF THE INVENTION

Due to concerns with limited resources of petroleum-based fuels, the demand for using renewable feedstock, such as vegetable oils and animal fats, to produce hydrocarbon fuels has increased. There are a number of well known methods for making diesel fuels or diesel fuel additives from renewable feedstock. Such methods, however, have limitations including producing fuels that are not always acceptable for commercial use.

Additives for diesel fuels whereby the additives have high cetane numbers and serve as fuel ignition improvers are known to have been made. One method for making such additives includes subjecting a biomass feedstock, such as tall oil, wood oil, animal fats, or blends of tall oil with plant or vegetable oil, to a hydroprocessing method to produce a product mixture. The product mixture is then separated and fractionated to obtain a hydrocarbon product that has a diesel fuel boiling range commensurate with known diesel duel products. This method results in an additive product that is characterized as performing poorly at low temperatures. In particular, the additive has a high cloud point at 25° C.

Another method of making a hydrocarbon suitable for use as diesel fuel includes subjecting a renewable feedstock, comprising C8-C24 fatty acids, derivatives of C8-C24 fatty acids, or combinations thereof, to a decarboxylation/decarbonylation reaction followed by an isomerization reaction. The product of the isomerization reaction is a hydrocarbon suitable for use as a diesel fuel additive. This process also produces a product having a high cetane value but poor low temperature properties, such as a high cloud point at around 25° C. As such, both mentioned resultant products are useful as diesel fuel additives but not usable as diesel or jet fuel replacements. Note that jet fuel requires significantly better low temperature properties than diesel. The cloud point is the temperature at which a fuel becomes hazy or cloudy because of the appearance of crystals within the liquid fuel.

A separate process produces a middle distillate fuel useful as diesel fuel having a cloud point of −12° C. from vegetable oil. The process includes hydrogentating the fatty acids or triglycerides of the vegetable oil to produce n-paraffins and then isomerizing the n-paraffins to obtain branched-chain paraffins. This process still suffers from a cloud point at a temperature that is comparatively too high.

To date, there appear to be no processes that produce a fuel having lower cold flow requirements, i.e. a cloud point lower than −12° C. In particular, there are no known processes to produce a stand alone Jet fuel from a renewable feedstock. To this end, it is to such a process and jet fuel composition that the present invention is directed.

SUMMARY OF THE INVENTION

The present invention relates to a method for producing from a renewable feedstock an isoparaffinic product useful for producing a jet fuel The renewable feedstock includes animal fats, vegetable oils, plant fats and oils, rendered fats, restaurant grease, waste industrial frying oils, fish oils, and combinations thereof.

The method for producing an isoparaffinic product useful as jet fuel typically includes hydrotreating a renewable feedstock to produce a hydrotreated heavy fraction and a light fraction. This is followed by hydroisomerizing the hydrotreated heavy fraction to produce a hydroisomerized heavy fraction and a light fraction. The hydroisomerized heavy fraction is passed into a separator to remove the iso-paraffin product with the remainder recycled back into the hydroisomerizing unit to produce an isoparaffinic product.

The method may also include fractionating the isoparaffinic product to produce a jet fuel, as well as, naphtha and liquefied petroleum gas (LPG), which includes primarily propane, iso-butane, n-butane, as well as small quantities of methane and ethane.

The resultant jet fuel product has improved cold flow properties. In particular, the jet fuel product has a viscosity of less than 5 centistokes at about −20° C., a boiling range of about 150° C. 300° C. and a freezing point of less than about −47° C.

A blended jet fuel composition of the present invention includes 0.1 to 99% by volume of a renewable jet fuel and a balance of at least one non-renewable resource.

DETAILED DESCRIPTION OF THE INVENTION

Figure 1:
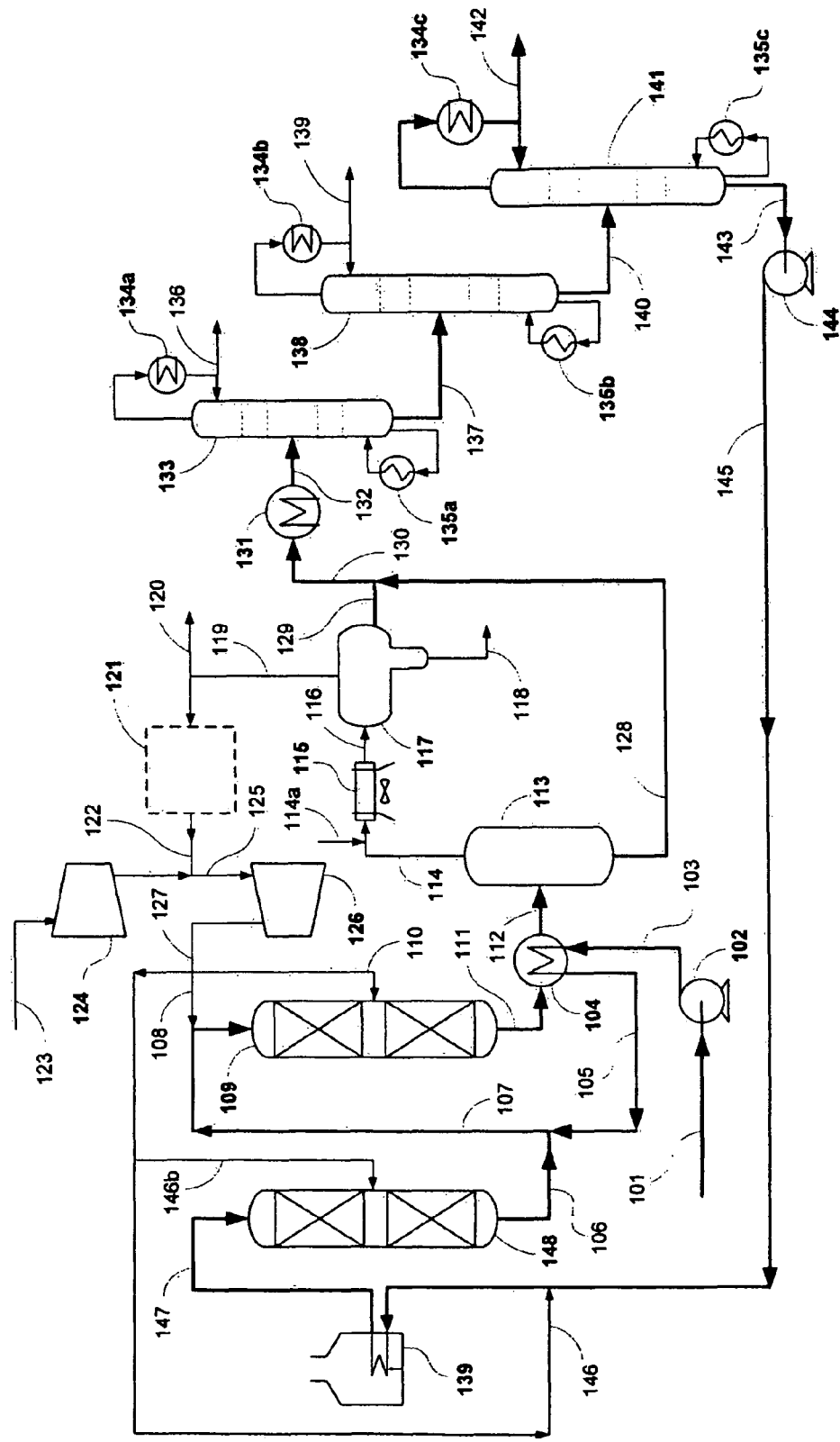
FIG. 1 is a schematic diagram of a method for co-producing an isoparaffinic product that may be fractionated into jet fuel, naphtha, and LPG from a renewable feedstock.

The present invention relates to a method for producing from a renewable feedstock an isoparaffinic product that can then be fractionated into a jet fuel or a liquefied petroleum gas (LPG) fraction. The process is illustrated by FIG. 1, with the method including hydrotreating the renewable feedstock to produce a hydrotreated heavy fraction that includes n-paraffins. Next, the hydrotreated heavy fraction, in particular the n-paraffins, is isomerized to produce among other products, isoparaffins. The method includes recycling a hydroisomerized heavy fraction back through the hydroisomerization unit to produce the isoparaffin product. The isoparraffin is then fractionated into a jet fuel and an LPG fraction. The LPG fraction includes primarily propane, iso-butane, n-butane, as well as small quantities of methane and ethane. A jet fuel is produced from a renewable feedstock whereby the jet fuel has improved cold flow properties.

In one embodiment, the present method for co-producing an isoparaffinic product useful as a jet fuel and an LPG fraction includes a hydrotreating step, a hydroisomerization step, and a fractionation step having recycle of the heavy hydroisomerization products. As shown on FIG. 1, a renewable feedstock is initially fed to the processing system. The renewable feedstock can include animal fats, animal oils, vegetable fats, vegetable oils, plant fats, plant oils, rendered fats, restaurant grease, waste industrial frying oils, fish oil, and combinations thereof. It should be understood by one of ordinary skill in the art that other oils can be used so long as they are of a sufficient structure to be ultimately converted into the isoparaffinic product. In particular, the renewable feedstock includes triglycerides and free fatty acids. Tryglycerides are esters of fatty acids and have a formula of $CH_2(OOCR_1)CH(OOCR_2)CH_2(OOCR_3)$, where $R_1$, $R_2$, and $R_3$ are typically of a different chain length. Fatty acids have a formula of $CH_3(CH_2)_x COOH$ and contains 4 to 22 carbon atoms.

Referring now to the process embodiment of FIG. 1, renewable feedstock 101 is pressurized using pump 102 to a hydrotreater 109 operating pressure of about 1,000 to about 2,000 psig (with pressures as low as about 250 psig and as high as about 3,000 psig also within the embodiment operating range). The renewable feedstock liquid hourly space velocity through the hydrotreater 109 is preferably in the about 0.5 to about 5 h$^{-1}$ range. The hydrotreater 109 catalyst is preferably a sulfided bimetallic catalyst such as NiW (nickel-tungsten), NiMo (nickel-molybdenum), and CoMo (cobalt-molybdenum) on alumina support. One suitable catalyst is sulfided NiMo on alumina. However, it should be understood that any catalyst may be used so long as the catalyst functions in accordance with the present invention as described herein. The catalyst may be in the oxide form and sulfided during startup, or pre-sulfided and active when loaded into the hydrotreater 109. The liquid feedstock is then heated through a hydrotreater feed-effluent exchanger 104. The heated feed is combined with hot product 106 from hydroisomerizer reactor 148. The diluted renewable feedstock is then combined with hydrogen 108 before entering the hydrotreater 109. Due to the high oxygen content and unsaturation level of the renewable feedstock, the exothermic hydrodeoxygenation and olefin hydrogenation reactions may result in a higher than desired adiabatic temperature rise. Quench hydrogen 110 may thus be used to maintain the hydrotreater temperature between about 500° F. to about 700° F., with temperatures as low as about 300° F. and as high as about 850° F. The gas to liquid ratio (renewable feed basis) for the hydrotreating reaction is about 2,000 to about 14,000 scf/bbl range.

The hydrotreater effluent 111 is subsequently cooled in exchanger 104. A cooled stream 112 includes two phases. The vapor phase includes hydrogen, propane, carbon oxides, and water. The liquid phase is predominantly the middle distillate boiling range paraffin product. The vapor and liquid phases are separated in separator 113 as streams 114 and 128, respectively.

The vapor phase 114 is cooled in air cooler 115 to condense the water. Wash water 114a may be introduced upstream to prevent scale formation in the cooler. A cooler outlet stream 116 includes liquid water, hydrogen/propane vapors, and condensed light hydrocarbons (mainly C3-C9 paraffins). These three phases are separated in drum 117. Hydrogen-rich vapors 119 are recycled, a condensed hydrocarbon stream 129 is sent to the product recovery unit, and a water stream 118 is sent off site for treatment prior to disposal or usage.

A liquid paraffin product 128 is combined with the condensed light hydrocarbon stream 129 to form a fractionation feed 130. The fractionation train includes a debutanizer tower 133, a naphtha stripper 138, and a heavy paraffin recycle tower 141. The fractionation train feed is preheated in exchanger 131. The debutanizer tower 133 is used to recover the LPG stream 136. The naptha stripper 138 is used to separate naphtha as stream 139. The high volatility, low flash point C5-C8 hydrocarbons are undesirable in jet fuel. Recycle tower 141 is used to separate the jet fuel 142 from the heavier paraffin stream 143. In a preferred embodiment, the jet fuel 142 is mainly a C9-C15 isoparaffin composition, while the heavies stream 143 is a C16$^+$ n-paraffin composition. (For most renewable feedstocks wherein C16 and C18 fatty acids predominate, the heavy paraffin fraction is a C16-C18 composition; however, for renewable feedstocks with significant C20 and C22 fatty acids, such as peanut oil and rapeseed oil, respectively, the heavies paraffin stream may be a C16-C20 and a C16-C22 composition.) The distillation columns range in pressure from 200 psig (debutanizer tower 133) to atmospheric or even vacuum (heavy paraffin recycle tower 141). The corresponding operating temperatures are about 300° F. to about 650° F. range. All the distillation towers are equipped with condensers (134 a-c) and reboilers (135 a-c). The condensers may be water- or air-cooled. For the higher temperature tower 141, super-heated steam injection may be used instead of a reboiler exchanger. It should also be noted that any two distillation columns with similar pressures may be combined and one of the products separated as a side-draw. Further, it should be understood that any such combination of columns may be utilized so long as the combination functions in accordance with the present invention described herein.

The heavy paraffins 143 are pumped to hydroisomerizer reactor pressure, preferably about 1,000 to about 2,000 psig, and combined with hydrogen 146. The hydrogen containing heavies recycle stream is then heated in heater 139 to the desired hydroisomerizer inlet temperature of about 580° F. to about 680° F. Suitable catalysts for the hydroisomerizer reactor 148 are bifunctional catalysts with hydrogenation and acidic functionalities. Such catalysts include Group VIII metals on amorphous (e.g. silica-alumina) or crystalline (e.g. zeolite) supports. One preferred hydroisomerization catalyst is platinum, palladium or combinations of same on an amorphous silica-alumina support. However, it should be understood that any catalyst may be used in accordance with the present invention so long as it functions as described herein. Preferred gas to liquid ratios are in the about 1,000 to about 10,000 scf/bbl range, and liquid hourly space velocity in the about 0.2 to about 5 h$^{-1}$ range. The product of the mainly C15-C18 feed, stream 106, is a C3-C18 isoparaffinic composition. This isoparaffinic product stream acts as a solvent/diluent for the hydrotreater feed.

Part of the hydrogen recycle stream 119 is purged as stream 120. In some embodiments, the purge stream 120 is processed through a membrane separator to recover additional propane. The recycle hydrogen is processed through a purification unit 121 where ammonia, hydrogen sulfide, and carbon dioxide byproducts of hydrotreating are removed. Unit 121 may be a scrubber with an amine or caustic solvent. Clean hydrogen 122 is combined with makeup hydrogen 123 (pressurized through compressor 124) to form hydrogen stream 125. Recycle compressor 126 supplies pressurized hydrogen to both hydrotreater (stream 108) and hydroisomerizer (stream 146), including quench service (110 for hydrotreater and 146b for hydroisomerizer).

The resultant feedstock jet fuel meets aviation fuel cold flow properties. The jet fuel of the present invention, unlike its petroleum and synthetic jet fuel counterparts, such as Jet A-1, JP-8, and Fischer-Tropsch IPK Jet Fuel, has a lower viscosity, for example, a viscosity at about −20° C. of less than about 5 centistokes, with a higher isomer/normal mass ratio, as is detailed in Example 2. Table 1 summarizes the iso/normal ratio for each carbon group in the jet fuel composition of the present invention The jet fuel composition of the present invention has an iso/normal ratio of about 3.0 to about 25.0. Typically, a higher isomer/normal mass ratio leads to a jet fuel product having a higher viscosity. That is not the case with the jet fuel of the present invention. It is believed that the lower viscosity of the jet fuel of the present invention is due to the distribution of the isomers in the isoparaffinic product as calculated by a nuclear magnetic resonance (NMR) apparatus.

TABLE 1

| Group | Iso/Normal Ratio by Group |
| --- | --- |
| C6 | 0.25-2.0 |
| C7 | 2.0-3.0 |
| C8 | 2.0-3.0 |
| C9 | 2.0-3.5 |
| C10 | 3.0-4.5 |
| C11 | 4.0-5.0 |
| C12 | 4.5-5.5 |
| C13 | 4.5-6.0 |
| C14 | 4.5-6.0 |
| C15 | 5.0-6.5 |
| C16 | 10.0-22 |
| C17 | 11.0-22 |

The feedstock jet fuel of the present invention also has a higher flash point than that required for JP-8 and Jet A-1, a lower viscosity and freezing point, and a higher smoke point. The jet fuel is almost sulfur free and produces a higher heat of combustion than JP-8 and Jet A-1. In particular, the jet fuel of the present invention has a flash point of greater than about 38° C. and greater than about 45° C. One embodiment of the jet fuel of the present invention has a boiling point range between about 150° C. and about 300° C., and a viscosity at about −20° C. of less than about 5 centistokes. The jet fuel of the present invention also has a heat of combustion of greater than about 42 MJ/kg and a smoke point of greater than about 25 mm. The jet fuel has a freezing point of less than about −47° C., less than about −50° C., and less than about −55° C. The jet fuel also has a sulfur content of less than about 5 ppm, preferably less than about 2 ppm.

Jet fuel is exposed to very low temperatures both at altitude—especially on polar routes in wintertime—and on the ground at locations subject to cold weather extremes. Consequently, the fuel must retain its fluidity at these low temperatures or fuel flow to the engines will be reduced or even stop. Viscosity is a measure of a liquid's resistance to flow under pressure generated either by gravity or a mechanical source.

As such, jet fuel must be able to flow freely from fuel tanks in the wings to the engine through an aircraft's fuel system. Fluidity is a general term that deals with the ability of a substance to flow, but it is not a defined physical property. Viscosity and freezing point are the physical properties used to quantitatively characterize the fluidity of jet fuel.

Jet fuel at high pressure is injected into the combustion section of the turbine engine through nozzles. This system is designed to produce a fine spray of fuel droplets that exaporate quickly as they mix with air. The spray pattern and droplet size are influenced by fuel viscosity. If the viscosity is too high, an engine can be difficult to relight in flight. For this reason, jet fuel specifications place an upper limit on viscosity.

Despite conforming to jet fuel specifications, the renewable isoparaffinic jet fuel of the present invention may need to be blended with conventional petroleum jet fuel for use in existing aircraft. Due to absence of aromatic components, the isoparaffinic jet fuel does not swell the nitrile rubber closure gaskets of the fuel tank. Without swelling of the closure gasket, a tight seal is not achieved and fuel may leak out. Blending with petroleum fuel addresses this issue. In the present invention, the blended jet fuel composition is from about 0.1% to about 99% by volume and the balance (about 1% to about 99.9% by volume) being from at least one non-renewable source.

In order to further illustrate the present invention, the following examples are given. However, it is to be understood that the examples are for illustrative purposes only and are not to be construed as limiting the scope of the subject invention.

EXAMPLES

Example 1

Process of Making a Jet Fuel from Renewable Sources

The present example demonstrates how a jet fuel was made from a renewable feedstock. A 100 cc isothermal tubular reactor was filled with 80 cc of Criterion 424 Ni—Mo catalyst and +70-100 mesh glass beads. The catalyst was sulfided with dimethyl disulfide at two hold temperatures: 6 hours at 400° F. and 12 hrs at 650° F. Hydrogen sulfide break-through was confirmed before the temperature was raised from 400° F. to 650° F. at 50 F/hr. After sulfiding, the reactor was cooled to 400° F.

Next a triglyceride/fatty acid feed was introduced to the isothermal reactor. The reactor was slowly heated to 650° F. to achieve full conversion of the triglyceride/fatty acid feed to n-paraffins. The reactor temperature was further increased to 700° F. to maintain good catalyst activity at 80 cc/hr feed rate (1 LHSV).

The total liquid hydrocarbon (TLH) from the hydrotreater was then hydroisomerized to jet fuel using the conditions summarized in the last column of Table 2 to produce an isoparaffinic product useful as jet fuel. The hydrotreater performance with beef tallow as the triglyceride/fatty acid feed is also summarized in Table 2.

TABLE 2

Hydrotreater and Hydroisomerizer Operating Conditions and Conversion Performance.

| | Hydrotreater | Hydroisomerizer |
| --- | --- | --- |
| Catalyst | | |
| Active Metals | Sulfided Ni/Mo | Pt/Pd |
| Support | Alumina | Alumina/silica |
| Reactor Conditions | | |
| Feed | Inedible tallow | TLH from inedible tallow hydrotreating |
| Temperature (F.) | 700 | 685 |
| Pressure (psig) | 1,200 | 1,000 |
| Gas/Oil Ratio (scf/bbl) | 14,000 | 10,000 |
| LHSV | 1 | 0.75 |

TABLE 2-continued

Hydrotreater and Hydroisomerizer Operating Conditions and Conversion Performance.

|  | Hydrotreater | Hydroisomerizer |
|---|---|---|
| Products (wt % feed basis) | | |
| C1 + C2 | 1.5 | 0.13 |
| LPG (C3 + C4) | 6.1 | 8.6 |
| Water | 5.3 | 0 |
| Total Liquid Hydrocarbons (TLH) | 88.2 | 91 |

Example 2

The hydrotreated effluent was analyzed using a gas chromatogram. In particular, the total liquid hydrocarbon (TLH) from the hydrotreater reaction of Example 1 was analyzed to confirm triglyceride conversion, and quantify cracking to light ends.

The gas chromatogram utilized the following materials:
Materials:
Analytical Balance, capability to 0.1 mg
Carbon Disulfide, High Purity
Custom Alkane Standard—Restek Cat #54521
Pasteur Pipette with bulb
HP 5860 Gas Chromatograph—FID
GC Column, Restek—Rtx—1MS, Cat #11624
Helium Gas—Alpha Gas
Hydrogen Gas—Alpha Gas
Zero Air Gas—Alpha Gas
Sharpie
GC Vials and Caps The gas chromatogram was operated under the following conditions:
Runtime 82 minutes
Injection Volume 1-μL
Inlet Temperature 320° C.
Detector Temperature 350°
Oven:
  Initial Temperature 35° C.
  Rate (° C./min) 5.00
  Equilibrate Time 0.20 min
  Final Temperature 320° C.
  Final Time (min) 25.0

Figure 2:
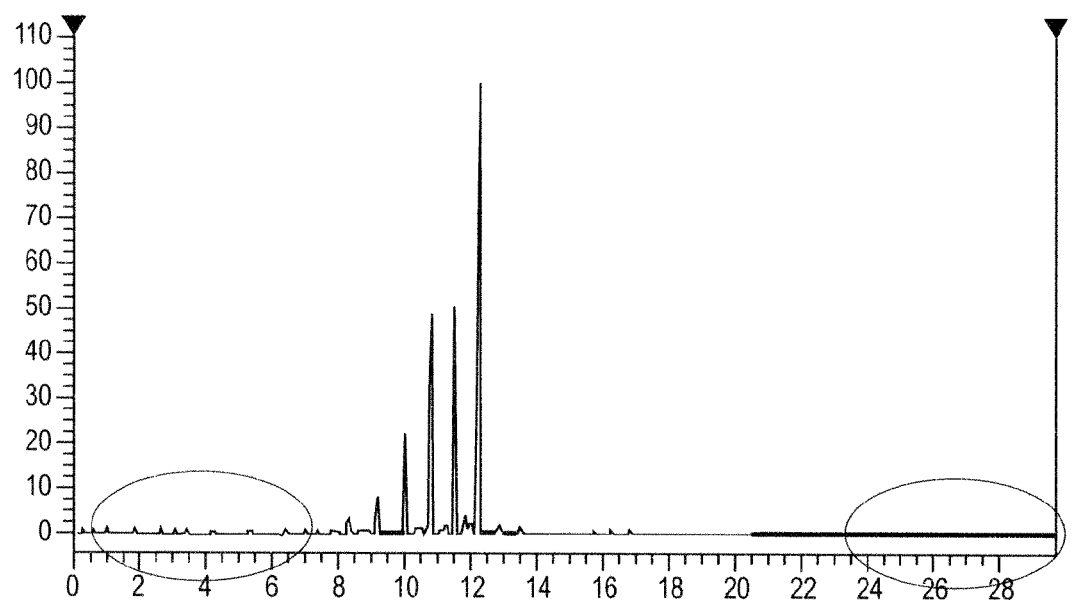
FIG. 2 is a gas chromatogram of hydrotreater effluent, showing absence of unconverted feed component and cracked products.

As observed in the chromatogram of FIG. 2, virtually no triglycerides or cracked products were present in the TLH. Note the areas circled.

Example 3

Jet Fuel from Renewable Sources

The resultant jet fuel and the isoparaffinic product from Example 1 was analyzed and compared to similar products. The feedstock jet fuel was found to have a cloud point of −53° C.

The composition of the isoparaffinic product was analyzed via Gas Chromatograph and is summarized in Table 3. A key property to observe is iso/normal ratio. The procedure employed to determine iso/normal ratio is shown below. As indicated by Table 3 data, hydroisomerizer product may be fractionated to the desired jet fuel boiling range such separation was performed using standard lab distillation apparatus. The comparable properties of Fischer-Tropsch IPK jet fuel distillate are summarized in Table 5. As observed from Table 4, the renewable jet fuel of this invention met or exceeded all key specifications of commercial jet fuel.

TABLE 3

Carbon Number Distribution and Iso/Normal Ratio of Hydroisomerizer Product

| Group | MW | Mass % | Isomer Mass % | Normal Mass % | Iso/Normal Ratio by Group | Normal Mass % by Group |
|---|---|---|---|---|---|---|
| C6 | 86.2 | 0.8% | 0.0% | 0.8% | 0.00 | 100.0 |
| C7 | 100.2 | 3.9% | 2.6% | 1.3% | 2.07 | 32.6 |
| C8 | 114.2 | 6.6% | 4.9% | 1.7% | 2.87 | 25.9 |
| C9 | 128.3 | 9.3% | 7.4% | 1.9% | 3.97 | 20.1 |
| C10 | 142.3 | 11.5% | 9.7% | 1.7% | 5.57 | 15.2 |
| C11 | 156.3 | 12.5% | 11.0% | 1.5% | 7.41 | 11.9 |
| C12 | 170.3 | 12.1% | 10.9% | 1.3% | 8.71 | 10.3 |
| C13 | 184.4 | 10.4% | 9.5% | 0.9% | 10.41 | 8.8 |
| C14 | 198.4 | 8.5% | 7.6% | 0.9% | 8.86 | 10.1 |
| C15 | 212.4 | 9.5% | 8.4% | 1.1% | 7.75 | 11.4 |
| C16 | 226.5 | 8.5% | 7.7% | 0.7% | 10.50 | 8.7 |
| C17 | 240.5 | 5.3% | 5.0% | 0.3% | 15.98 | 5.9 |
| C18 | 254.5 | 1.1% | 1.1% | 0.0% | 23.91 | 4.0 |
| TOTAL | | 100.0% | 85.9% | 14.1% | 6.12 | |
| Narrow Jet (C9-C15) | | 73.8% | 64.6% | 9.2% | 7.01 | |
| Broad Jet (C8-C16) | | 88.9% | 77.2% | 11.7% | 6.62 | |

The iso/normal ratio is derived by processing GC data. Data is first captured from chromatogram, it is compared to standard libraries. Next, the amount of normal paraffin present for each carbon number was calculated. Then, the amount of iso-paraffin present for each carbon number was calculated. Finally, the ratio for each carbon number was calculated.

TABLE 4

Jet Fuel Properties of Example Bio-jet Product Compared to Other Synthetic Jet Fuels and Industry Specifications

| Property | Units | ASTM D 1655 Jet A-1 | MIL-83133E JP-8 | Fischer-Tropsch IPK Jet Fuel | Example Bio-Jet Product |
|---|---|---|---|---|---|
| Flash Point | ° C. | 38 min. | 38 min. | 46 | 47 |
| Distillation EP | ° C. | 300 max. | 300 max. | 280 | 275 |
| Viscosity @ −20° C. | cSt | 8.0 max. | 8.0 max. | 5.5 | 4.58 |
| Freezing Point | ° C. | −47 max. | −47 max. | −48 | −55 |
| Density | g/ml | 0.775-0.840 | 0.775-0.840 | 0.76 | 0.76 |
| Heat of Combustion | MJ/kg | 42.8 min. | 42.8 min. | 43.8 | 44.2 |
| Smoke Point | Mm | 25 min. | 25 min. | >50 | 33.4 |

TABLE 4-continued

Jet Fuel Properties of Example Bio-jet Product Compared to Other Synthetic Jet Fuels and Industry Specifications

| Property | Units | ASTM D 1655 Jet A-1 | MIL-83133E JP-8 | Fischer-Tropsch IPK Jet Fuel | Example Bio-Jet Product |
|---|---|---|---|---|---|
| Sulfur | ppm | 3,000 max. | 3,000 max. | <1 | 1.2 |
| Hydrogen | Mass % | none | 13.4 min. | 15.4 | 15.3 |
| Color (Saybolt) | — | none | report | +30 | +30 |

TABLE 5

Carbon Number Distribution and Iso/Normal Ratio of Fischer-Tropsch IPK Jet Fuel

| Group | MW | Isomer Mass % | Normal Mass % | Iso/Normal Ratio by Group | Normal Mass % by Group |
|---|---|---|---|---|---|
| C6  | 86.2  | 0.0%  | 0.0%  | 0.0% | 0.59  | 62.9 |
| C7  | 100.2 | 0.6%  | 0.4%  | 0.2% | 2.16  | 31.7 |
| C8  | 114.2 | 1.9%  | 1.3%  | 0.6% | 2.13  | 32.0 |
| C9  | 128.3 | 7.2%  | 4.8%  | 2.4% | 2.02  | 33.2 |
| C10 | 142.3 | 17.8% | 13.9% | 3.9% | 3.57  | 21.9 |
| C11 | 156.3 | 20.2% | 16.4% | 3.9% | 4.25  | 19.1 |
| C12 | 170.3 | 17.1% | 14.2% | 2.9% | 4.88  | 17.0 |
| C13 | 184.4 | 15.2% | 12.8% | 2.4% | 5.46  | 15.5 |
| C14 | 198.4 | 10.8% | 9.0%  | 1.8% | 4.89  | 17.0 |
| C15 | 212.4 | 6.3%  | 5.3%  | 1.0% | 5.41  | 15.6 |
| C16 | 226.5 | 2.6%  | 2.4%  | 0.1% | 21.33 | 4.5  |
| C17 | 240.5 | 0.4%  | 0.4%  | 0.0% | 11.77 | 7.8  |
| C18 | 254.5 | 0.0%  | 0.0%  | 0.0% |       |      |

Thus, there has been shown and described a method for producing a jet fuel or LPG product from a renewable source and the resultant product that fulfills all objectives and advantages sought therefore. The invention illustratively disclosed herein suitably may be practiced in the absence of any element which is not specifically disclosed herein. Further review of the two jet fuels reveals that they are very similar in average carbon number (11.8 and 12.0 for the FT and renewable, respectively). Also, in the case of the FT jet fuel, the hydroisomerization conditions were 703° F. Catalyst average temperature, LHSV of 0.83/hr (fresh feed basis) and G/O ratio of 3,000 SCF/BBL with overall system pressure of about 986 psig with the same catalyst (Pt/Pd on alumina/silica). It is surprising that the processing conditions of the present invention resulted in substantially different low temperature property performance; that is, that the renewable jet fuel would have had lower viscosity than the FT jet fuel product based upon the difference in processing conditions.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed.

Those skilled in the art will appreciate that variations from the specific embodiments disclosed above are contemplated by the present invention. Specifically, the improvement in cold-flow performance of the renewable jet fuel was not anticipated based upon extensive experience with Fischer-Tropsch feedstocks. The typical Fischer-Tropsch feedstock to a hydroisomerization process is about 85-99 wt % normal paraffin. The feedstock to the renewable isomerization process is >95 wt % normal paraffin. The distribution of isomers and the nature of the branching in those isomers (as indicated by NMR) is different for the renewable feedstock versus the Fischer-Tropsch feedstock. The invention should not be restricted to the above embodiments, but should be measured by the following claims.

What is claimed is:

1. A method for producing from a renewable feedstock an isoparaffinic product useful as jet fuel, the method comprising:
   a. hydrotreating a renewable feedstock comprised of triglycerides, free fatty acids, and combinations thereof with a $C_3$-$C_{18}$ isoparaffinic diluent from step b) to produce a n-paraffinic fraction;
   b. hydroisomerizing n-paraffinic fraction to produce an isoparaffinic fraction and a heavy fraction;
   c. separating the heavy fraction from the isoparaffinic fraction; and,
   d. recycling the heavy fraction of step (c) to the hydroisomerizing step of step (b).

2. The method of claim 1 further comprising the step of fractionating the isoparaffin to produce jet fuel.

3. The method of claim 1, wherein the renewable feedstock is selected from the group comprising animal fats, animal oils, vegetable fats, vegetable oils, rendered fats, restaurant grease, waste industrial frying oils, fish oils, and combinations thereof.

4. The method of claim 1, wherein the hydrotreating step operating conditions comprise a reaction temperature of from about 300° F. to about 850° F. and a reaction pressure of from about 250 psig to about 3000 psig.

5. The method of claim 1, wherein the hydroisomerizing step operating conditions comprise a reaction temperature of from about 300° F. to about 850° F. and a reaction pressure of from about 250 psig to about 3000 psig.

6. The method of claim 1, wherein the isoparaffinic product has a boiling point range of from about 150° C. to about 300° C.

7. A method of co-producing liquid petroleum gases, isoparaffinic naphtha, and jet fuel, the method comprising:
   a. hydrotreating a renewable feedstock comprised of triglycerides, free fatty acids, and combinations thereof with a $C_3$-$C_{18}$ isoparaffinic diluent from step b) to produce a hydrotreated heavy fraction and a light fraction;
   b. hydroisomerizing the hydrotreated heavy traction to produce a hydroisomerized heavy fraction and isoparaffin;
   c. recycling the hydroisomerized heavy fraction to step (b) and hydroisomerizing the hydroisomerized heavy fraction to produce an isoparaffinic product; and d. fractionating the isoparaffinic product and the light fraction to produce liquid petroleum gases, isoparaffinic naphtha, and jet fuel.

8. The method of claim 7, wherein the liquid petroleum gases comprise propane, iso-butane, and n-butane.

9. The method of claim 7 wherein the renewable feedstock is selected from the group comprising of animal fats, animal oils, vegetable fats, vegetable oils, rendered fats, restaurant grease, waste industrial frying oils, fish oils, and combinations thereof.

* * * * *